United States Patent Office.

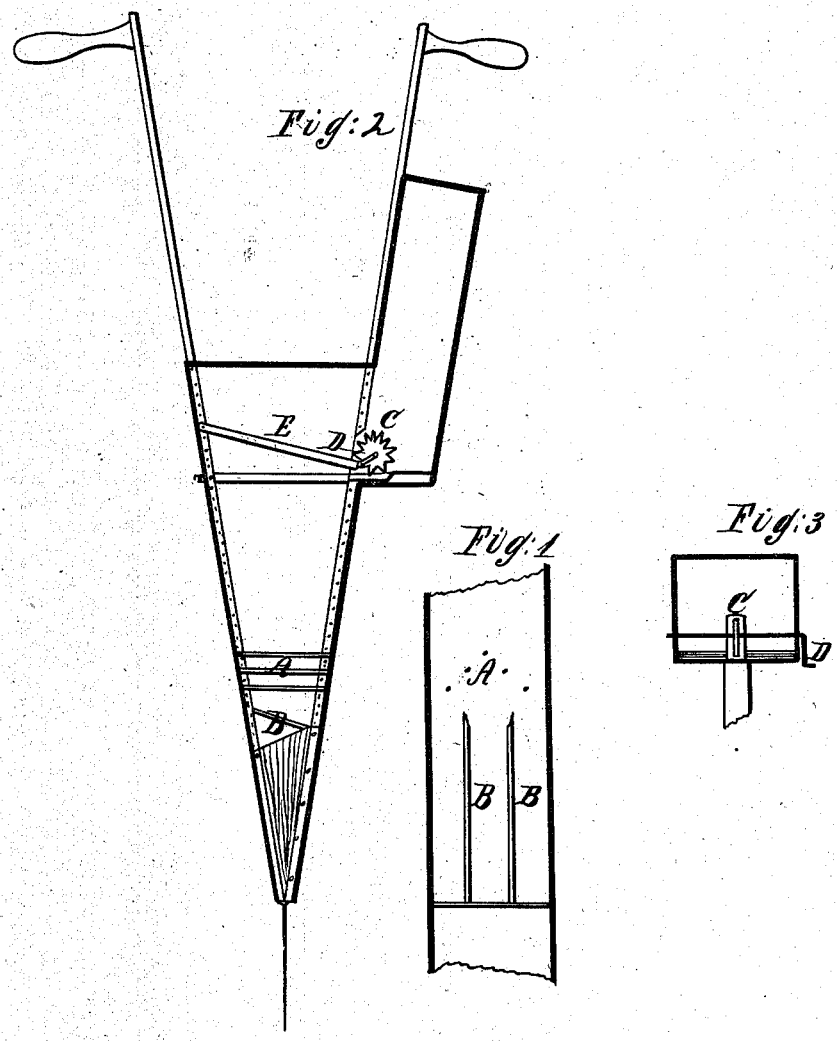

JONATHAN W. CRUME, OF TROY, MISSOURI.

Letters Patent No. 106,034, dated August 2, 1870.

---

IMPROVEMENT IN CORN-PLANTERS.

---

The Schedule referred to in these Letters Patent and making part of the same.

---

I, JONATHAN W. CRUME, of Troy, county of Lincoln, State of Missouri, have invented certain Improvements in Hand Corn-Planters, of which the following is a specification.

Nature and Objects of the Invention.

The first part of my invention relates to the combination of pins and cleats, in such a manner that the corn shall be scattered when it falls upon the pins, and be kept separated by the cleats, thus effectually preventing the corn from being deposited in the ground in a bunch, the object of this part of my invention being to scatter the corn and keep it apart until deposited in the ground.

The second part of my invention relates to the combination of a toothed wheel, crank, and bar, in such a manner as to regulate the number of grains which passes out of the grain-box, and prevent the feed-hole from clogging up with grain, the object of this part of my invention being to regulate the number of grains which passes out of the grain-box, and to prevent the clogging of the feed-hole.

General Description.

A are five pins, which are fastened securely to one side of the machine, and play through holes in the opposite side thereof.

B B are cleats, which divide the lower end of the machine into three compartments.

The corn falls upon the pins, and is scattered and falls into the compartments, and, when the top of the machine is closed, the blades are opened, and the corn is deposited in the ground to the full width of the blades.

C is a toothed wheel.

D is a crank upon the end of the shaft, upon which the wheel C is fastened.

E is a bar attached to the crank D, and fastened to the opposite side of the machine.

When the machine is opened at the top the bar E and crank D cause the wheel C to revolve, which moves the grain off from the feed-bar, and allows only the number of grains necessary to fill the hole through the feed-bar to pass out of the grain-box.

The partial revolution of the wheel C back and forth, at the bottom of the grain-box, every time the machine is opened and closed, prevents clogging.

Claims.

I claim as my invention—

1. The combination of the pins A and cleats B B, substantially as and for the purpose hereinbefore set forth.

2. The combination of the wheel C, crank D, and bar E, substantially as and for the purpose hereinbefore set forth.

JONATHAN W. CRUME.

Witnesses:
JAMES M. McLELLAN,
FRANCIS C. CAKE.